US 8,442,585 B2

(12) United States Patent
McMahan et al.

(10) Patent No.: US 8,442,585 B2
(45) Date of Patent: May 14, 2013

(54) WIRELESS DEVICE GROUPING VIA COMMON ATTRIBUTE

(75) Inventors: Ryan J. McMahan, Cedar Rapids, IA (US); Sergey Sannikov, Marion, IA (US); Samantha J. Olson, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 13/080,391

(22) Filed: Apr. 5, 2011

(65) Prior Publication Data

US 2011/0183714 A1    Jul. 28, 2011

Related U.S. Application Data

(62) Division of application No. 11/602,908, filed on Nov. 21, 2006.

(51) Int. Cl.
*H04B 1/38* (2006.01)
(52) U.S. Cl.
USPC .......................................................... 455/557
(58) Field of Classification Search ....................... None
See application file for complete search history.

(56) References Cited

U.S. PATENT DOCUMENTS

| 6,968,565 | B1 * | 11/2005 | Slaney et al. .................... 725/10 |
| 7,170,857 | B2 * | 1/2007 | Stephens et al. ............... 370/230 |
| 2001/0051915 | A1 * | 12/2001 | Ueno et al. ...................... 705/39 |
| 2002/0137544 | A1 * | 9/2002 | Myojo ............................ 455/557 |
| 2003/0095524 | A1 * | 5/2003 | Stephens et al. ............... 370/338 |
| 2005/0229255 | A1 * | 10/2005 | Gula et al. ........................ 726/23 |
| 2005/0257055 | A1 * | 11/2005 | Anderson ..................... 713/170 |
| 2006/0181963 | A1 * | 8/2006 | Clayton et al. ............. 369/24.01 |
| 2008/0039212 | A1 * | 2/2008 | Ahlgren et al. ................. 463/46 |

* cited by examiner

*Primary Examiner* — Yuwen Pan
*Assistant Examiner* — Ayodeji Ayotunde
(74) *Attorney, Agent, or Firm* — Shook Hardy & Bacon LLP (57) ABSTRACT

The present invention enables users of wireless devices to configure a service by automatic connection through the use of a local environmental indication of an identification code such as a barcode. The identification code represents a service that is a labor carried out among a group of two or more devices for the benefit of one or more devices in the group. An indication of an identification code is input to at least one device representing a service over a wireless link among at least a first and second device. At least one service relationship such as sender, receiver, transceiver, or relay is identified for each of a first and second device, and the devices are automatically configured into their respective service relationships utilizing the identification code.

17 Claims, 5 Drawing Sheets

WIRELESS DEVICE GROUPING VIA COMMON ATTRIBUTE

CROSS-REFERENCE TO RELATED APPLICATIONS

This application is a divisional of U.S. application Ser. No. 11/602,908, filed Nov. 21, 2006. The entire specification of U.S. application Ser. No. 11/602,908, including all text and drawing figures, is herein incorporated by reference.

STATEMENT REGARDING FEDERALLY SPONSORED RESEARCH OR DEVELOPMENT

Not Applicable.

BACKGROUND

In our increasingly mobile society, communication devices increasingly make use of wireless channel technology for communication over many kinds of links. Wireless technology provides diverse benefits such as avoiding the cost, safety problems, and inconveniences of cables; and allowing the user of a communications device some degree mobility. For example, in cellular telephony, users are able to talk on the telephone in diverse areas that would have been inconvenient, or even impossible without using wireless link technology. With the advantage of wireless telephony, users are able to communicate not only while tethered to a wireline phone, but also while driving in cars, waiting in line at the supermarket, waiting for a bus, hiking, boating, etc. These advantages that have been experienced in cellular telephony are sought in many other service applications as well. For example, wireless links between computers allow users to transfer content from a first computing device to a second computing device. Wireless links allow cable-free bar-code wand scanning. Wireless links allow cable-free network access. Wireless links allow the cables to be eliminated between computers and printers. Wireless links may be employed to allow hands-free operation of either a wireline or a cellular telephone.

In general the problems of managing a wireless link are different than wireline communication. Wireline devices typically are powered by power cables. The disconnection of power for wireline devices may be a very rare event. In contrast, wireless devices often rely on battery power for some portion of their use. A wireless device may not be able to communicate while being charged. To save battery life, a mobile device may shut itself off, or it may be intentionally shut off by the user. During these shut-down periods, the other devices that are available for service may change since the device itself may be moved to a new location, or the other devices may have moved out of range, or powered off.

In an attempt to solve these different problems some vendors have implemented proprietary wireless protocols. Such proprietary solutions may become dominant and generally available, but usually there are several other vendors who issue their own proprietary protocols and so devices do not interoperate. In order to achieve ubiquity of interoperable wireless devices, several standards committees have been formed to establish specifications. Among these standards committees are IEEE 802.11, also called the WiFi standard, IEEE 802.16 also called Wireless Metropolitan Area Networks, and IEEE 802.20 also called Mobile Broadband Wireless access. Another standards committee, IEEE 802.15, also called Wireless Personal Area Networking, includes the Bluetooth standard. Many of these standards have achieved a great deal of ubiquity, so that it is common to have four or more compatible devices in the same area dedicated to diverse services. In a meeting of 8 people in a conference room, for example, there could easily be 8 personal computers and a printer using WiFi to communicate with a WiFi hotspot to gain access to a corporate network. In the same conference room there could also be 8 Bluetooth capable cell-phones that communicate over 3 different incompatible cellular carriers, and there could be two Bluetooth wireless microphones for the speakers. This single meeting contains 10 WiFi devices and 11 Bluetooth devices.

Those devices which make use of a wireless protocol for a service application gain an advantage when the same protocol is used for other diverse service applications. The greater the number of service applications, the greater the volume of production, and therefore the devices needed for the protocol become more readily available and less expensive. As ubiquity increases, however, the need to deal with other services in the same area becomes more important. There is a general need for wireless devices to perform methods of service connection in an efficient and user-friendly manner. There is also a general need for wireless devices to be constructed in such a manner as to support efficiency and ease of use.

SUMMARY

The present invention is defined by the claims below, not this summary. Embodiments of the present invention provide a computer-readable media for performing a method of service connection. An indication of an identification code is input into a local device that represents a service over a wireless link between itself and one or more remote devices. A service relationship is identified for the local device and associated with the identification code. At least one remote device is identified as having a service relationship to the local device based on the identification code. The local device is automatically configured into the identified service relationship, and the remote device is automatically configured into its service relationship using the identified code.

In a first aspect, an exemplary embodiment of the present invention relates to a local device for automatic wireless system configuration supporting content transfer. The local device includes a first input component which is configured to receive an indication of an identification code. The identification code is used to represent a service that is common between the local device and at least one remote device participating in content transfer. A processor is coupled to the first input component and also to a wireless adapter. The processor runs an application that identifies a service relationship of the local device associated with the identification code. The application automatically connects to at least a first remote device by communicating the identification code over the wireless adapter.

In another aspect, an exemplary embodiment of the present invention relates to a user interface for registration of at least a first remote wireless device. A prompt in the user interface indicates that an identification code must be input. The identification code represents a service that is common among a local device and at least a first remote device participating in content transfer. An input component of the user interface receives an indication of the identification code. A control in the user interface identifies a service relationship associated with the identification code for the local device. A status display in the user interface indicates successful automatic connection among a local device and at least a first remote device. The display indicates success after the local device establishes the service relationship with at least a first remote wireless device associated with the identification code.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

As one skilled in the art will appreciate, embodiments of the present invention may be embodied as, among other things: a device, user interface, or computer-readable medium. Accordingly, the embodiments may take the form of a hardware embodiment, a software embodiment, or an embodiment combining software and hardware. In one embodiment, the present invention takes the form of one or more computer-readable media that include computer-useable instructions embodied thereon.

Computer-readable media include both volatile and nonvolatile media, removable and nonremovable media, and also include media readable by a database, a computer, and various other computing devices. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

The subject matter of the present invention is described with specificity herein to meet statutory requirements. However, the description itself is not intended to limit the scope of this patent. Rather, the inventors have contemplated that the claimed subject matter might also be embodied in other ways, to include steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed.

Figure 1:
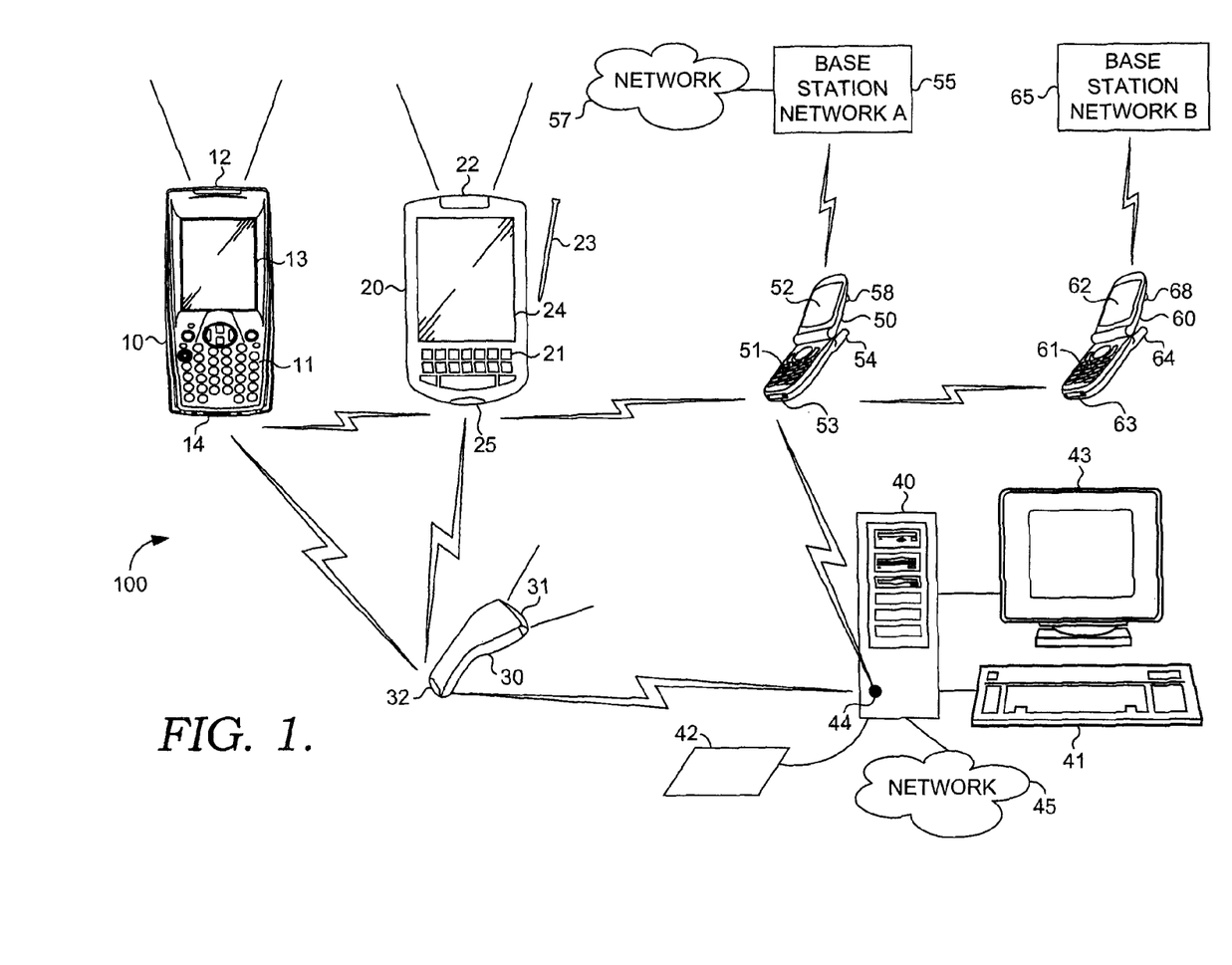
FIG. 1 depicts an exemplary system environment suitable for use in implementing embodiments of the present invention.

Considering FIG. 1 an exemplary environment for an ubiquitous wireless service is depicted generally as environment 100. A number of devices are depicted in 10, 20, 30, 40, 50 and 60. Wireless adapters, such as 14, 25, 32, 44, 53 and 63, on each respective device allow those other devices within range to communicate by an ubiquitous wireless protocol. Device 10 illustrates a handheld computer such as the Intermec® 741B color mobile computer, having a full alphanumeric keypad 11 for input, as well as an image sensor 12 for barcode scanning, and a color display 13. Device 20 illustrates a handheld computer such as the Intermec® 730 mobile computer, having a numeric keypad 21 for input, an image sensor 22 for barcode scanning, and a stylus 23 for input to a touch sensitive screen 24. The screen 24 also serves as a display component. Device 30 illustrates a wand scanner such as the Intermec® Scanplus 1802 Vista handheld scanner. Device 30 has, for example, an imaging sensor 31 for detecting barcodes, and a wireless adapter 32 for communication with another device such as computer 40 via a wireless base station 44. Device 40 is a desktop computer having an input component such as a keyboard 41 and a flatbed barcode scanner 42. Device 40 is also outfitted with a monitor 43 for displaying a user interface to an operator. Device 40 is also connected to a network 45 which may for example be a point of sale network, corporate network, or the Internet. Device 50 depicts a cell phone with a keypad input component 51 and an imaging sensor input component 58 used, for example as a camera. Device 50 also has a display component 52, ubiquitous wireless adapter 53, and an antenna 54 for communication with a base station 55 in network A, having an interface to network 57. Device 60 is similarly a cell phone having keypad input component 61, imaging sensor input component 68, display component 62, ubiquitous wireless adapter 63, and antenna 64 for communication with a base station 65 in network B. In this example networks A and B are different and incompatible, so that an image collected by device 50 through input component 58, cannot be sent via the cellular antenna 54 for relay to cellular antenna 64 of device 60.

An exemplary wireless service may be shared among a subset of devices 10, 20, 30, 40, 50 and 60, when each member of the subset has some form of wireless communication capability established by virtue of their respective communication adapters 14, 25, 32, 44, 53, and 63. A service is a labor carried out among a group of two or more devices such as 10, 20, 30, 40, 50, and 60, for the benefit of one or more devices in the group. One exemplary service is temporary one-way file transfer. For example, device 50 may have a favorite picture that was collected using image sensor 58 that a user would like to transfer to device 60. In this example there are two service relationships. Device 50 has a sender relationship to the service, and device 60 has a receiver relationship to the service. Another exemplary service is temporary two-way file transfer. For example, device 10 may wish to browse files available on device 20, and request files for transfer at the same time that device 20 browses files available on device 10, and requests files for transfer. In this service both device 10 and device 20 have a transceiver relationship to the service of temporary two-way file transfer. Another exemplary service is registration of one device with another for a continuous relationship. For example, device 30 may wish to be registered with device 40 as an associated wand barcode scanner as an alternative scanning input to flatbed barcode scanner 42. In this example device 30 has a service relationship of a registered scanner data source, and device 40 has a service relationship of a scanner data sink.

Other exemplary services involve multiple devices, with each device possibly having multiple service relationships. In one exemplary service a scanner software update service is provided by device 10 for devices 20 and 30. Device 10 then has a broadcast server relationship for the software update service. Devices 20 and 30 have a client relationship to the broadcast service. Another exemplary service is text chat among devices 10, 20, 50, and 60. In one exemplary embodiment device 10 can only communicate with device 20, device 20 can only communicate with device 10 and 50, and device 50 can only communicate with devices 60 and 20. In this service device 10 would have a relationship of transceiver with device 20. Device 20 would have a service relationship of transceiver with devices 10 and 50, and a service relationship of relay with devices 10 and 50. Device 50 likewise would have a service relationship of transceiver with devices 20 and 60, and a relay relationship with devices 20 and 60. Device 60 would have a transceiver relationship with device 50. Other service examples include registration of other peripherals such as printers, news aggregation, event notification, email service, calendar update, etc. Other device service relationships such as a gateway, bridge, and etc. are well within the range of intended services as will be understood by those skilled in the art.

As will be appreciated by those skilled in the art, the connection of devices for wireless service is typically a tedious process that involves the user in the minutia of the underlying protocol used by the wireless adapter. To illustrate the difficulty involved, consider the transfer of a single file from one Windows® Mobile device 10 to another Windows® Mobile device 20 using a Bluetooth wireless adapter. Since wireless devices typically depend upon battery life, at the beginning of the transfer, the Bluetooth devices are likely to be turned off to conserve energy. The transfer involves many steps and many different software utilities. First the user of device 10 must turn on Bluetooth on this device, and make sure that this device is discoverable by other devices. This may involve going into a Bluetooth settings window and checking a box that says "Turn on Bluetooth", and checking another box that says "Make this device discoverable to other devices." Next the user of device 20 must turn on Bluetooth in device 20. This is done by going into a "Beam Settings" dialogue box and selecting a box that says "Receive all incoming beams." Device 10 then indicates the desire to send this file by using file explorer and picking "Beam file . . . " from a drop down menu. Next the user of device 10 must select a device to send the file to. This typically takes about 15 seconds, involving a list of all devices within range. Typically the list presented is a sequence of letters and numbers indicating a Bluetooth device address, but lacking any meaning to the user for selection since the user is typically not aware of the address. Over time these may be replaced with device names, but users may still have a tough time picking the correct device. To add to the confusion, as device names are populated, some devices may request a bonding. The user is prompted to enter a passcode, which the user may or may not know. Typically this request is from a device that the user doesn't even plan to send the file to. Some users don't know that they can cancel this request. Some may interpret it as an unauthorized wireless activity. Once the correct device is chosen, there still may be another waiting period for other unrelated Bluetooth name queries to complete before the file transfer can proceed. The desired file transfer may be delayed in a pending state until the remote devices respond. In an embodiment, a method can be provided that does not force the user to explicitly perform protocol specific, or adapter specific operations. In another embodiment, a service could be performed without the user explicitly making a device visible, making a device connectable, selecting a Bluetooth device address, selecting a Bluetooth device name, handling bonding requests for unrelated devices, turning Bluetooth on, or viewing devices that are not relevant to the service. The present invention provides many such benefits in the implementation of the various embodiments.

Figure 2:
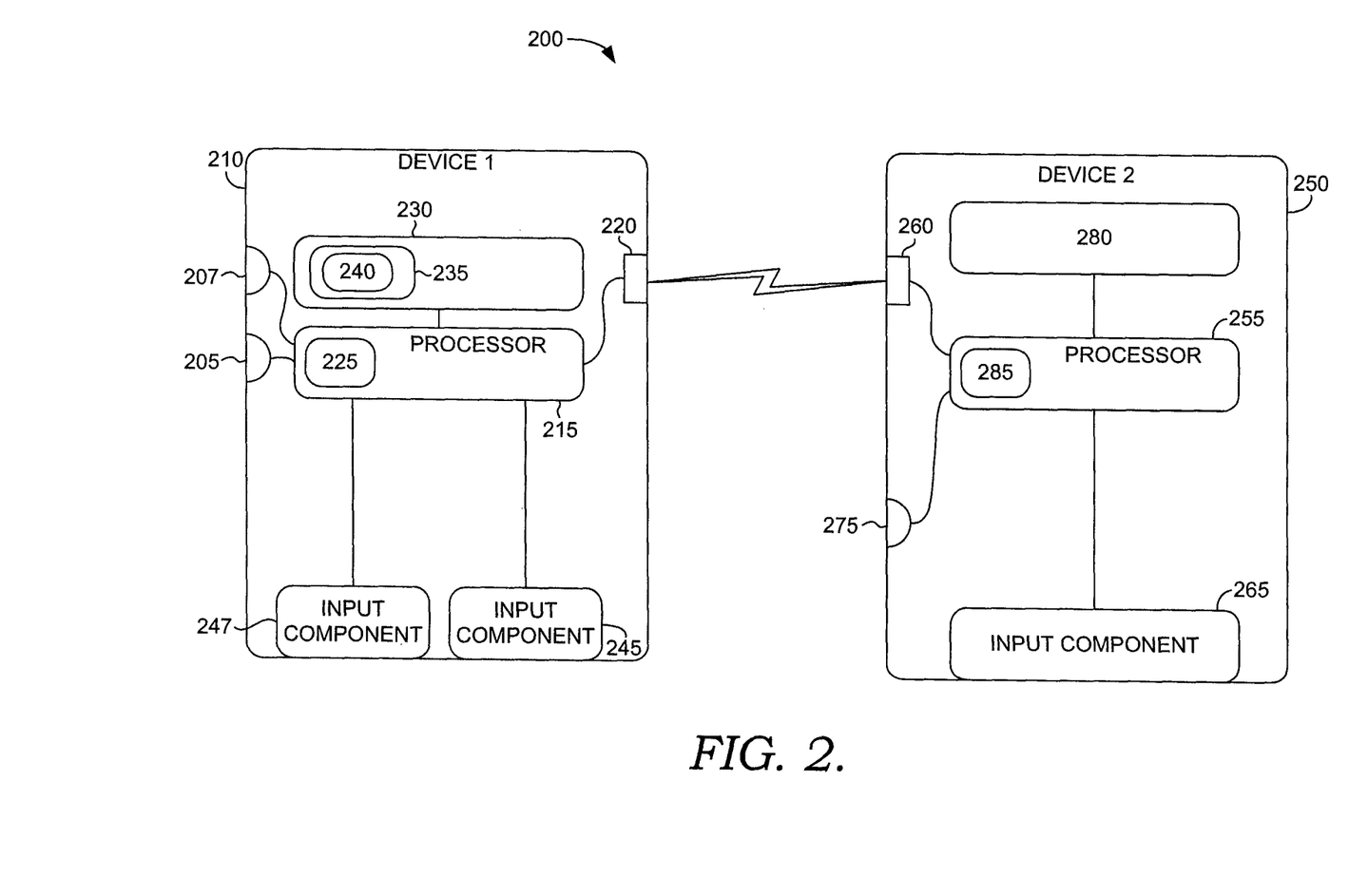
FIG. 2 depicts embodiments of devices suitable for performing the present invention.

Turning now to FIG. 2, there are depicted some embodiments of devices suitable for performing the invention, indicated generally as 200. This figure shows a first device 210 in wireless communication with a second device 250 over their respective communication adapters 220 and 260.

Device 210 comprises a first input component 245 that receives an indication of an identification code representing a service that is common between at least a first device 210 and a second device 250. A processor 215, running application 225, receives the indication of the identification code, associates the identification code with a service, and identifies at least a first service relationship for the first device 210 with the identification code. Application 225 on first device 210 communicates through an interface of processor 215 to wireless communication adapter 220. The application 225 automatically connects to second device 250 by transmitting the identification code over the wireless adapter 220. Embodiments of the first device also include a display component 230 for displaying the state of the application 225. A display component may be a monitor, LCD Screen, speaker or other output component. Embodiments also include a portion 235 of the display 230 that is utilized by the application 225 and a graphical user interface 240 for controlling application 225. Embodiments of the first device also include an additional input component 247, wireline network adapter 205, and a cellular network adapter 207.

The second device 250 includes an input component 265 that receives an indication of an identification code representing a service that is common between at least the first device 210 and the second device 250. A processor 255, running application 285, receives the indication of the identification code, associates the identification code with a service, and identifies at least a second service relationship for the second device 250 with the identification code. Application 285 on second device 250 communicates through an interface to processor 255 to wireless communication adapter 260. Application 285 parses transmissions that are received on the wireless adapter 260 looking for a match to the service identification code. When a match is found second device 250 registers first device 210 as a participant in the service associated with the identification code, and thus both service relationships are configured for the service. In some embodiments a second input component 275 such as a mouse or keyboard is used to select content to be transferred. In some embodiments display 280 provides information and control of the program to the user through input component 265. Content may include computer files, application specific files, folders containing a number of files, media streams, and the like.

Input components 265, 245, and 247 may be any of a variety of input components suitable for deriving a common identification code from the input signal such as a motion sensor, velocity sensor, accelerometer, microphone, mouse, barcode scanner, range laser, linear imager, area imager, keypad, touch screen, keyboard, or virtual keyboard. As a first embodiment, a readily available bar-code such as that found on a soda can could be used to input the same code into both devices 210 and 250. In this embodiment, components 245 and 265 are barcode scanners. The code that is input to the two devices is the common barcode from the soda can. It is input to device 210 by holding the can in front of an input barcode scanner 245. It is input to device 250 by holding the can in front of input barcode scanner 265. Many other combinations are possible, for example, the code from the can could alternatively be typed into a keypad on one or both of the devices. In another embodiment, the two devices 210 and 250 are held in close proximity and shaken. In this embodiment, the input components 245 and 265 could be motion sensors, velocity sensors, or accelerometers. An algorithm processing the motion indication derives an identical parameter from the motion in each processor 215 and 255. This common parameter is used as the common identification code. For example, the velocity could be determined by a common algorithm and rounded off to a precision that gives a high probability that the same number is determined in both processors. In another embodiment, input components 245 and 265 are microphones. The same word is spoken in the range of both microphones, and the word is processed in each processor 215 and 255 through a speech recognition algorithm. This word is then used as the identification code. In another embodiment the first device 210 computes a random string that is preferably short and easy to enter, and displays this as a suggested code in graphical user interface 240. In some embodiments application 225 monitors other identification codes used, and makes a selection not likely to interfere with them. A checkbox when selected by an input component 265 such as a mouse constitutes an indication that this suggested code is to be used. A user then enters the suggested code into an input component 265, such as a keypad, of the second device 250. An indication of an identification code may be drawn from a broad range of environmental parameters that are common to the devices utilizing the service. An indication could be reading of a barcode, a common motion such as shaking the devices, a common input such as speech, a common number entry on a keypad, checking a box to accept a suggested code, etc.

Processors 215 and 255 may for example be a standard computer processor such as the Intel® XScale™, Pentium™, Itanium™, or Xeon™ processors. Alternatively, the processor could be dedicated logic or some combination of a standard computer processor and dedicated logic. Likewise the applications 225 and 265 may be software running on the processors. The applications could alternatively be embodied as a dedicated hardware function or some mixture of hardware and software.

The wireless adapters 220 and 260 are coupled to their respective processors 215 and 255 to carry out a compatible wireless protocol. In one embodiment the wireless adapter 220 is mounted in one or more computer chips on the same board as the processor 215. In another embodiment a wireless adapter is plugged into a USB port. In yet another embodiment a wireless adapter is plugged into a PC card slot. In some embodiments the wireless adapter performs a Bluetooth protocol.

Figure 3:
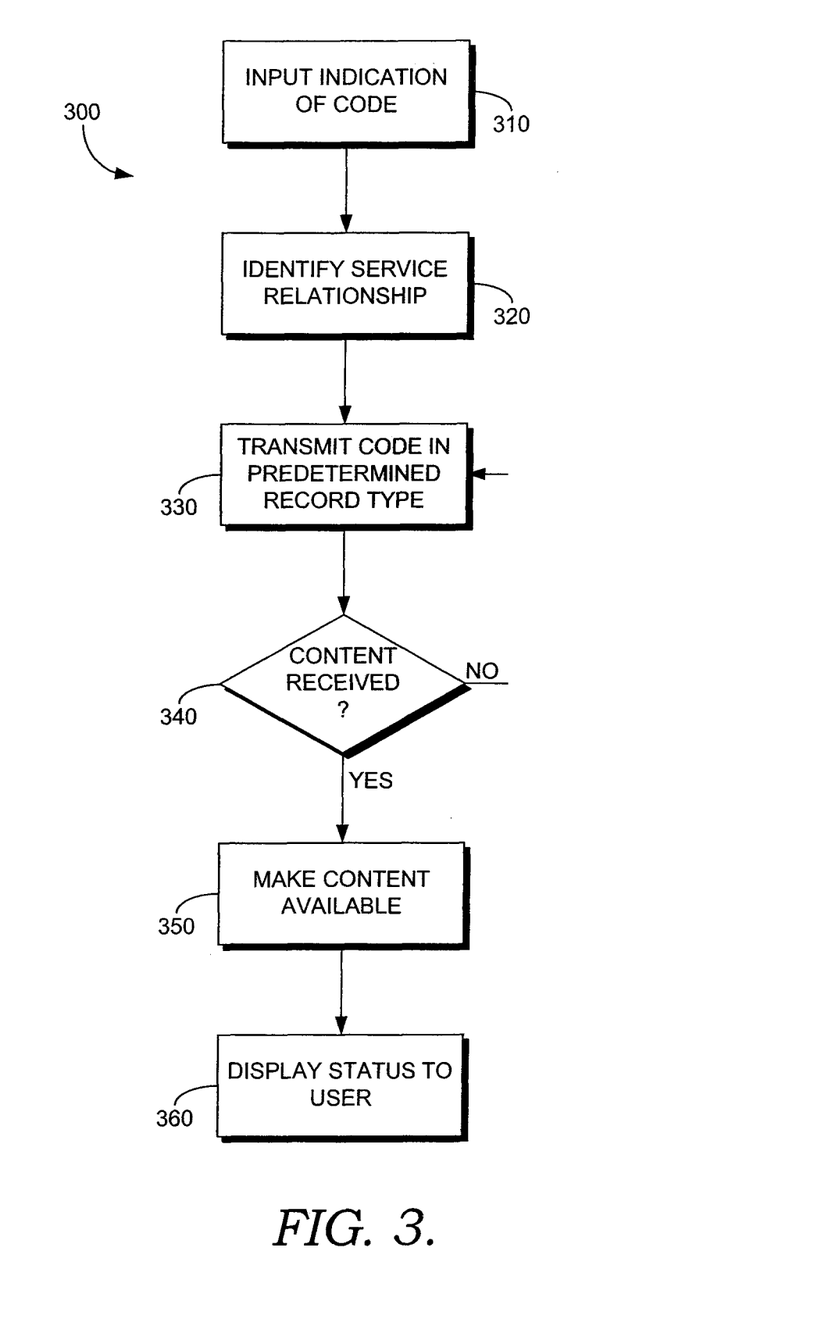
FIG. 3 depicts a flow diagram of receiver operations in a content transfer service to perform a method of service connection.
Figure 4:
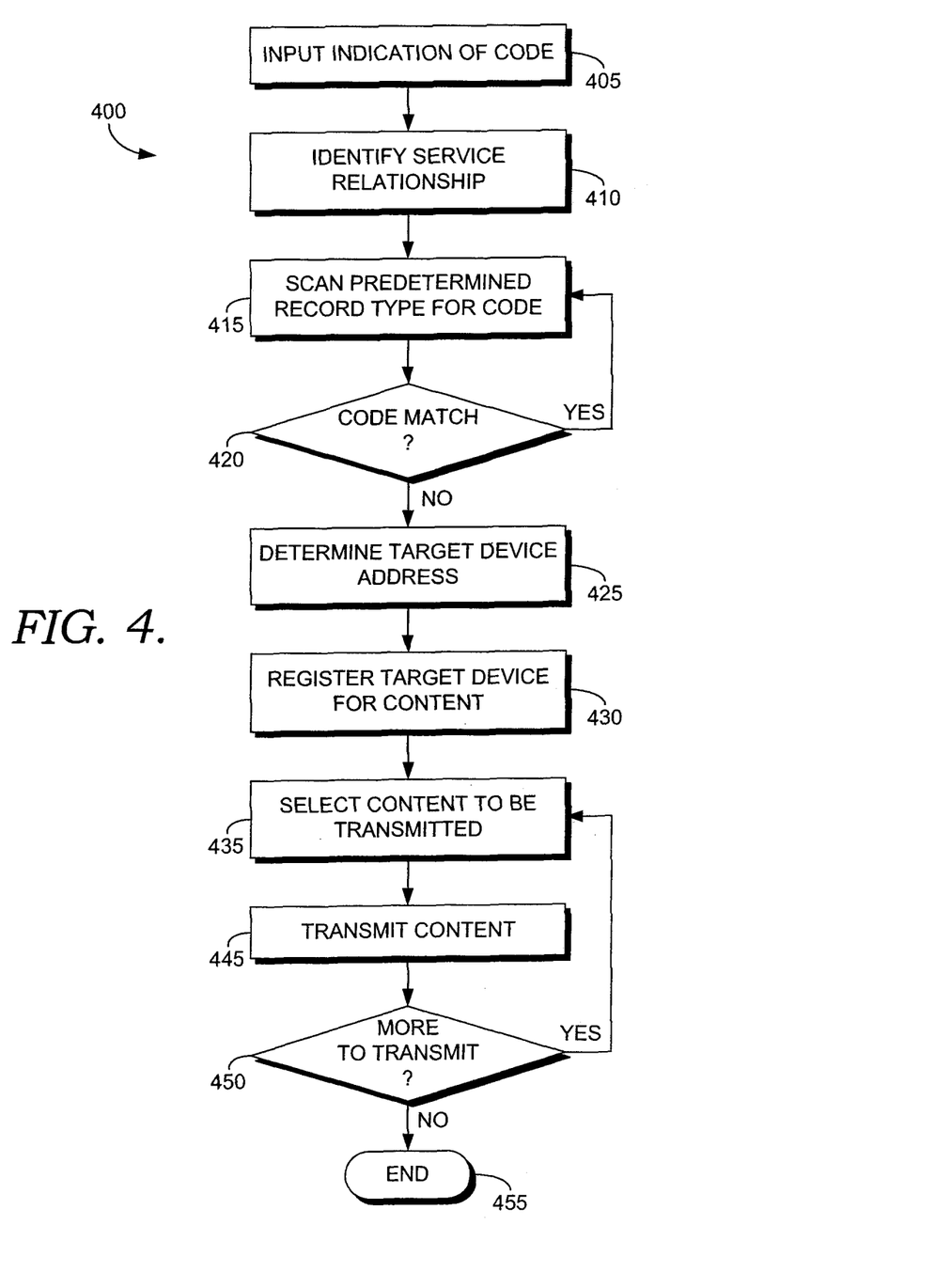
FIG. 4 depicts a flow diagram of sender operations in a content transfer service to perform a method of service connection.

Turning now to FIG. 3, and FIG. 4 there are depicted flow diagrams for computer-readable media for performing a method of service connection. Flow diagram 300 depicts the receiver operations for service connection while flow diagram 400 depicts the sender operations for service connection. At 310 an indication of an identification code is input into a first device such as 210. In some embodiments the indication results in the acquisition of raw sensor data such as an audio or image capture. These embodiments process the raw sensor data to produce an identification code so that an identical communication code is produced by processing similar data at 405 when, similarly, an indication of an identification code is input into a second device such as 250. In some embodiments the indication at 310 is input by holding up an object having a barcode symbol in front of a barcode scanner input device such as 245. In other embodiments the indication at 310 is input by selecting a check box in a display using a pointing device such as a mouse that accepts a suggested identification code. In other embodiments the indication at 310 is input by typing in a code into a keyboard or keypad.

Still with regard to FIG. 3 and FIG. 4, at 320 one or more service relationships are identified for a first device such as 210. For example, in a content transfer service, where device 210 is the receiver of the content, the service relationship for device 210 is identified as "receiver." In some embodiments this identification is made in connection with an overt action of the operator who selects the receiver identity in a menu or dialogue box. In other embodiments this identification is made implicitly, for example when an icon or menu item is activated indicating that the desired service relationships for device 210 are implicit in the selection of the icon or menu item. Similarly at 410 one or more service relationships are identified for a device such as 250. In some embodiments a single service relationship such as "sender" is identified at 410 when an icon or menu item is activated to send or beam a file to a remote device such as 210. In other embodiments at 410 a user selects one or more service relationships from a menu such as the selection of "sender".

Still with regard to FIG. 3 and FIG. 4, there is depicted therein a method for automatically configuring a devices such as 210 and 250 into their respective identified service relationships. At 330 a device such as 210 transmits the identification code in a predetermined type of record. In an exemplary embodiment where the wireless adapter protocol is Bluetooth, the predetermined record type is Service Discovery Protocol (SDP), and the identification code is contained within the service name of the SDP record. At 340 the method checks to see if content is received for device 210. If the content is not yet received, then the method returns to 330, and repeats a cycle of transmitting the identification code and looking for received content. At 415 a device such as 250 scans for the predetermined record type, and when it finds a record of proper type, at 420 the method looks for a match between a data field in the record of proper type and its own internal copy of the identification code. In an exemplary embodiment where the wireless adapter protocol is Bluetooth, the data field is the service name of an SDP record. If the code is not found in this record, then the method at device 250 returns to 415, continuing to scan for records of proper type. If the code is found at 420, then at 425 the record is further processed to determine the device address of the device which sent the predetermined record type having the embedded identification code. In one embodiment the predetermined record type contains the device address. In other embodiments the device address is discovered by further communication with the device that transmitted the matching record. In still other embodiments a local data store is consulted for determining the device address of the device that transmitted the matching record. At 430 the target device address is registered within a device such as 250, as a remote device eligible for the content transmission service. At this point a device such as 210 is automatically configured into the service relationship of receiver, and device 250 is automatically configured into the service relationship of sender.

Still with regard to FIG. 3 and FIG. 4, there is depicted therein an exemplary embodiment of content transfer within an established service. At 435 content is selected to be transmitted. In some embodiments 435 follows automatic configuration of the service. For example, the service having been established, the user of device 250 proceeds to transmit content at 445, and has the opportunity to select more content to transfer at 450, thereby returning to the content selection 435, and transferring as much content as desired for as long as desired. In other embodiments 435 precedes the establishment of service. For example, a user selects the file or content first and then indicates the operation of sending. Thereupon the content is already indicated and the service is established and content transmission 445 proceeds after configuration of both devices into the service relationship. In some embodiments the user then has the option of continuing transmission at 450, for example by prompting the user with the query "Send another file?" In other embodiments, the offer is implicit in a continuous prompt such as an actionable menu, file browser, or content tree. Content selected for transmission by device 250 is then received at device 210 at 340. Content that has been received is made available locally at 350, and status of the transfer is displayed to the user at 360. In some embodiments newly received content is automatically opened and utilized for example when the content is an audio file for a real-time audio transmission service. In some embodiments an icon or label is displayed showing the user that new content has been received. In an exemplary embodiment the user of device 450 chooses to discontinue the content transfer at 455, whereupon device 210 is notified of service termination and the service application of device 210 sends an acknowledgement to device 250 and terminates. Whereupon the service application of device 250 terminates. In other embodiments the service registration is stored in non-volatile memory, and persists through loss of power, battery changes, etc. until explicitly terminated by a user. In some embodiments a service is terminated by either device as desired by a user.

Figure 5:
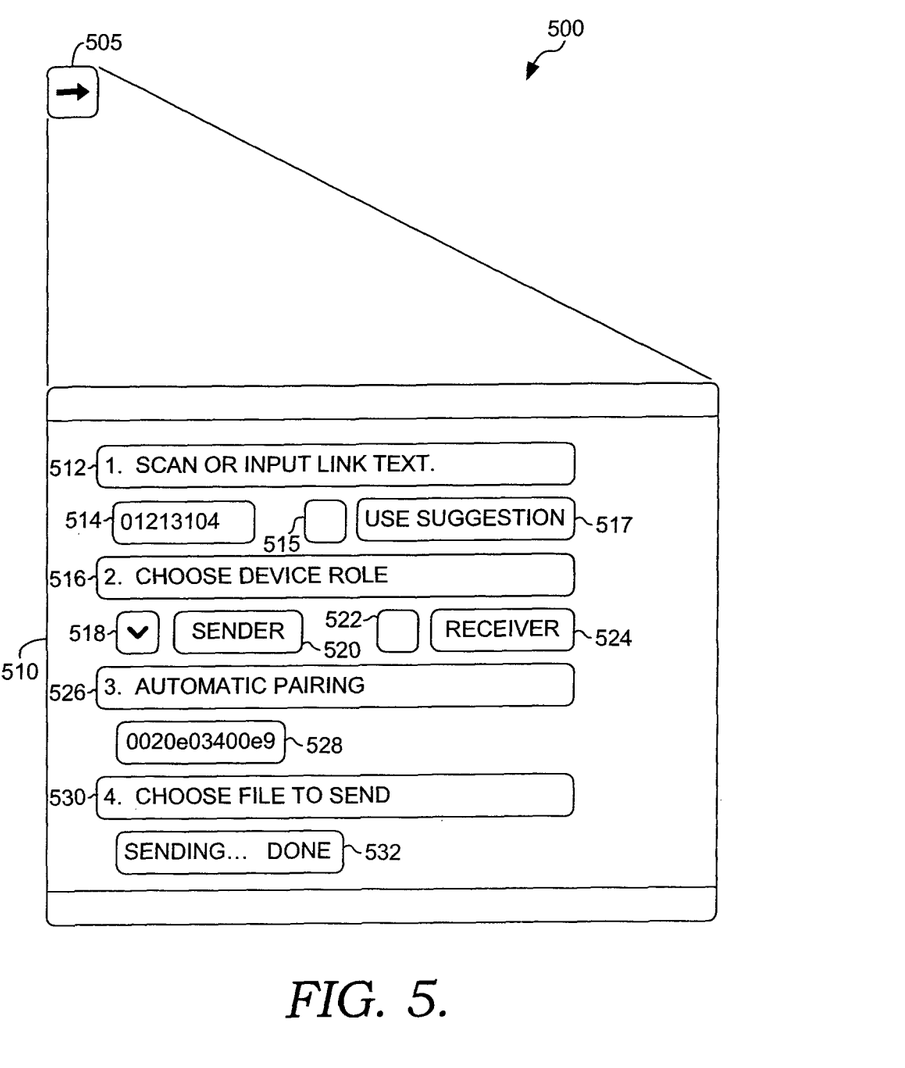
FIG. 5 depicts an exemplary user interface for registration of a first remote wireless device.

Turning now to FIG. 5 there is depicted therein and referred to generally as illustration 500, the use of an exemplary user interface such as 240 for registration of a first remote wireless device such as 210. In the illustrated embodiment, the same application runs on a device such as 210 with the same user interface 240 whether the device is chosen to identify a sender relationship to a content transfer service, or a receiver relationship to a content transfer service. Other embodiments provide an icon that is associated with a dedicated function. For example an icon launches and the service automatically indicates to application 225 a sender relationship of device 210 to a dedicated function of file sending. When a service initiation control 505 is activated in the user interface, a service description control 510 is presented to establish the service. Embodiments of the user interface use input activation techniques as are well known in the art such as mouse clicks, keyboard shortcuts, screen taps or equivalent operations to activate the initiation control 505. In other embodiments an icon is selected that activates services besides file transfer, such as registration of a printer, registration of a wireless scanner, instant messaging, software distribution. These services are then associated with an input identification code.

Still with regard to FIG. 5, the use of exemplary service description control 510 is considered when a service relationship of sender is desired by a user. The user responds to prompt 512 for example by typing in a barcode number at control 514. At 516 the user interface displays a prompt for the user to choose a service relationship for device 210. As illustrated in 518 the user identifies the sender relationship for a content transfer service. A status display at 528 indicates the status of automatic paring as indicated at 526. 528 displays a message such as "looking for remote device address" until service configuration is complete, at which point a device address is displayed. In the present example the device address found is 0020e03400e9. At 530 the sender is prompted to choose a file, whereupon, for example a file browser is launched allowing the user to indicate a file on device 210 to be sent. Status display 532 indicates that file transmission has been successful.

Still with regard to FIG. 5, the use of exemplary service description control 510 is considered when a service relationship of receiver is desired by a user. At 512 the user interface displays a prompt that indicates an identification code must be input. In one embodiment control 514 serves both as a display field suggesting an identification code, and as an input component for receiving an indication of an identification code. Control 514 may, for example, display a number derived from the device address for device 210. A user may select control field 514 and type in some other number than the one suggested. A user may also accept the suggestion by selecting checkbox 515 based on the prompt indicated as 517. Alternatively, a user may heed the prompt at 512 and indicate the identification code by holding up an object with a barcode to an image scanning input component such as 245. At 516 a prompt is given to the user to select one or more of the service relationships displayed in a menu in 518, 520, 522 and 524. The menu displayed allows the user to indicate a sender or receiver relationship, or both. Other embodiments allow the user to select relay, gateway or bridge. Controls in the present embodiment of the user interface include checkboxes 518 and 522. For the present example, the user selects checkbox 522, identifying device 210 as a receiver of content. A status display at 528 indicates the status of the attempt to automatically pair as indicated in 526. FIG. 5 at 528 illustrates the status for a sender after automatic pairing is successful, indicating the device address that has been located. For the present example, where selection of receiver is made instead, display 528 would provide a message such as "sending service request" before service is established and "service connected" once successful automatic connection is accomplished. FIG. 5 illustrates prompt 530 for a sender service relationship. For the selection of a receiver relationship instead, prompt 530 contains a prompt such as "Files received:" and status display 532 displays a status such as an icon or file name of the content that has been received for local use.

As can be seen, the present invention and its equivalents are well-adapted to provide a new and useful method for service connection of wireless devices. The present invention enables users of wireless devices to configure a service by automatic connection through the use of a local environmental indication of an identification code.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out, or carried out at all in some instances, in the specific order described.

The invention claimed is:

1. A local device for automatic wireless system configuration supporting a content transfer comprising:
a first input component of a local wireless device, the first input component configured to receive a first indication of an identification code, said identification code representing a service that is common among said local wireless device and at least a first remote wireless device for participating in a content transfer with said local wireless device, wherein said service is a labor carried out among the local wireless device and the at least a first remote wireless device for a benefit of one or more wireless devices, wherein said service comprises a service relationship for the local wireless device and a service relationship for the at least a first remote wireless device;
a first processor coupled to said first input component;
a first wireless adapter coupled to said processor; and
a first application running on said first processor, configured to identify at least one service relationship for said local wireless device associated with said identification code, said first application further configured to automatically connect to said first remote wireless device by communicating said identification code over said first wireless adapter to said first remote wireless device, wherein said identification code is communicated to said first remote wireless device based on an indication of said identification code transmitted from the local device to said first remote wireless device over the first wireless adapter,
wherein the first remote wireless device comprises a second input component configured to receive the indication of said identification code transmitted from the local wireless device, a second processor coupled to the first remote wireless device, and a second application running on said second processor, said second application configured to identify at least one service relationship for said remote wireless device associated with said identification code, wherein identifying the at least one service relationship for said remote wireless device associated with said identification code comprises parsing one or more wireless transmissions received by the first remote wireless device until a match to the identification code is detected,
wherein automatically connecting the local wireless device with the at least a first remote wireless device automatically enables the transfer of content between the local wireless device and the at least a first remote device based on the service relationship for said local wireless device identified based on the identification code and the service relationship for said remote wireless device identified based on the identification code.

2. The local device of claim 1, wherein said input component is selected from the set consisting of a first motion sensor, a first velocity sensor, a first accelerometer, a first microphone, a first barcode scanner, a first range laser, a first linear imager, a first area imager, a first keypad, a first touch screen, a first virtual keyboard, and a first keyboard.

3. The local device of claim 1, wherein said wireless adapter performs a Bluetooth interface.

4. The local device of claim 3, wherein said wireless adapter comprises a subcomponent chosen from the set consisting of a computer chip, a USB port, and a PC card.

5. The local device of claim 1, further comprising a display component coupled to the first processor for displaying the state of said application.

6. The local device of claim 1, further comprising a second input component configured to receive a content selection from a user for transfer at least to said first remote device.

7. The local device of claim 5, wherein said display component further comprises a graphical user interface subcomponent for controlling said application.

8. The local device of claim 5, wherein the graphical user interface displays a random string computed by said first processor and wherein said random string represent the identification code.

9. The local device of claim 2, wherein the first remote device comprises a second processor, a second microphone and at least one sensor from a set consisting of a second motion sensor, a second velocity sensor, and a second accelerometer.

10. The local device of claim 9, wherein the first and second processors process a same word spoken in a range of the first and second microphones.

11. The local device of claim 9, wherein the local device and the first remote device are held in close proximity and shaken and wherein an algorithm processing a motion and running on the first processor and the second processor derive a common parameter from the motion and this common parameter is used as the identification code.

12. The local device of claim 1, wherein the local device broadcast the service that is supported by the local device as a server.

13. The local device of claim 1, wherein the service that is common among said local device and the at least a first remote device is a two-way file transfer service.

14. The local device of claim 13, wherein the local device is configured to browse files on the first remote device and the first remote device is configured to browse files on the local device, such that the local device and the first remote device have a transceiver relationship to the service.

15. The local device of claim 1, wherein the service that is common among said local device and the at least a first remote device is a multiple service relationship.

16. The local device of claim 15, wherein the local device is configured to communicate with the first remote device via a second remote device.

17. The local device of claim 15, wherein the local device has a service relationship of transceiver to the second remote device, the first remote device has a service relationship of transceiver to the second remote device, and the second remote device has a service relationship of transceiver to the local device and the first remote device, and a service relationship of relay to the local device and the first remote device.

* * * * *